Feb. 9, 1943.    A. FRANZ    2,310,771
EXHAUST CONDUIT CONSTRUCTION
Filed July 19, 1939    2 Sheets-Sheet 1

Inventor:
Anselm Franz,
Bailey & Parson
Attorneys

Feb. 9, 1943.  A. FRANZ  2,310,771
EXHAUST CONDUIT CONSTRUCTION
Filed July 19, 1939   2 Sheets-Sheet 2
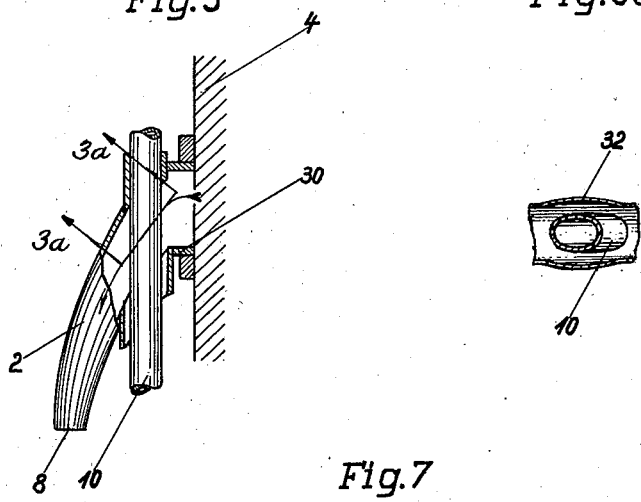
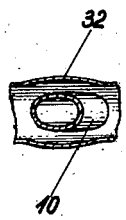
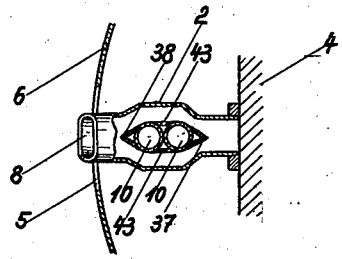
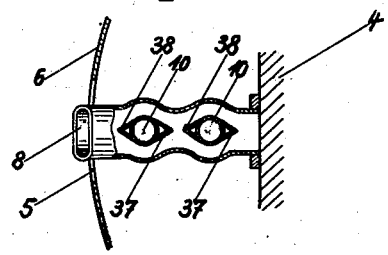
Inventor:
Anselm Franz,
Attorneys Patented Feb. 9, 1943

2,310,771

UNITED STATES PATENT OFFICE 2,310,771

EXHAUST CONDUIT CONSTRUCTION

Anselm Franz, Dessau, Germany; vested in the Alien Property Custodian

Application July 19, 1939, Serial No. 285,403
In Germany August 15, 1938

4 Claims. (Cl. 60—35.6)

This invention relates to the construction of exhaust conduits for internal combustion engines, and particularly aircraft engines.

The invention is more specifically directed to the construction of the exhaust conduits in aircraft engines wherein the exhaust conduits or exhaust stacks have the shape of short nozzles, each nozzle having one end attached to the engine block, and the other free end directed rearwardly of the aircraft, these nozzles acting as recoil producing nozzles by reason of the gases being emitted therefrom, the recoil aiding in the forward propulsion of the aircraft.

Because of the great heat and pressure developed in these conduits, it is desirable to use part of the heat for other purposes, this being accomplished by bringing air or other medium into heat exchange relationship with the conduits. The medium can be heated to such an extent that it is usable, for example, for the heating of the cabin of the aircraft. To obtain an intensive heat exchange between the cooling medium and the gases in the conduits, it is desirable to pass a pipe through the conduits, the medium flowing through the pipe. Such structure has the disadvantage of impeding the gas flow through the conduit by reason of the presence of the pipe, and further of causing the pipe to fail because of the heating thereof by the exhaust gases.

An object of the invention is to obtain heat from the recoil type exhaust conduits without a loss of the efficiency of the exhaust conduits as recoil nozzles.

Another object of the invention is to construct the exhaust conduits and heat exchange means therefor so that an intensive heat exchange takes place between the medium to be heated and the conduits without seriously diminishing the efficiency of gas flow through the conduits.

A further object of the invention is to construct the individual exhaust conduits as members through which a pipe can be passed, the conduit and pipe being so arranged as to provide a streamlined obstruction in the passage of exhaust gases in the conduit.

A further object of the invention is to construct the exhaust conduits and the pipe passing therethrough so that the pipe will not become heated to a destructive degree, while at the same time the flow of exhaust gases in the conduits is not materially impeded by the pipe.

A further object of the invention is to provide a coupling means for adjacent exhaust conduits so that a single, and preferably seamless, pipe can be passed through a plurality of conduits.

Generally these objects of the invention are obtained by forming an opening through each individual exhaust conduit and passing through this opening a pipe containing a medium to be heated. Either the opening, the pipe, or the opening in conjunction with the pipe, is so arranged as to present a streamlined obstruction in the path of the exhaust gases within the conduit, such creating an intensive heat exchange between the conduits and the pipe, while at the same time providing a minimum obstruction to the flow of gases in the exhaust conduit, so that the efficiency of the conduits and recoil nozzles is not materially diminished. The pipe which contains the heated medium after it leaves the exhaust conduits, is lead to the cabin of the aircraft or some other point of use of the heated medium.

A means by which these objects of the invention are obtained is more fully described in the following specification, taken in connection with the accompanying drawings, in which:

Fig. 3 is a side view partially in section showing a modified form of the invention as applied to an individual exhaust conduit.

Fig. 3a is a cross-sectional view taken on the line 3a—3a of Fig. 3.

Figs. 4 to 8 are transverse sectional views showing, respectively, modified forms of the invention.

Figure 1:
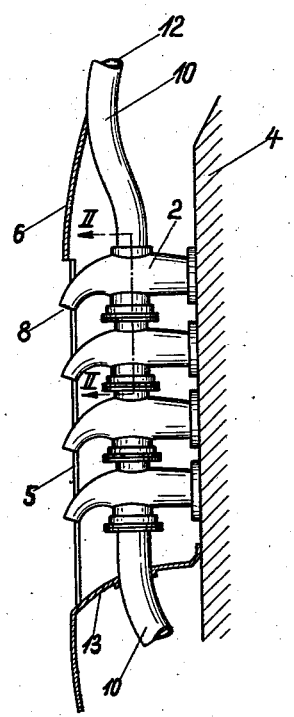
Fig. 1 is a side elevational view of a plurality of exhaust conduits with a pipe passing therethrough.
Figure 2:
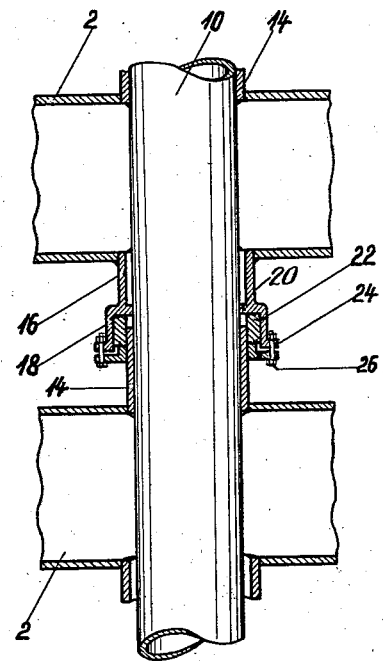
Fig. 2 is an enlarged cross-sectional view on the line II—II of Fig. 1.

In Figs. 1 and 2, individual exhaust conduits 2 project from the engine block 4 through an opening 5 in the covering 6 of the aircraft. The ends 8 of conduits 2 are formed as nozzles directed rearwardly of the aircraft and function as recoil nozzles to aid in the forward propulsion of the aircraft. Pipe 10 extends from an air intake 12 outwardly of the covering 6 of the aircraft, to and through the individual conduits 2. After leaving the last conduit 2 in a row of conduits, pipe 10 passes through a wall 13 which separates the exhaust conduit opening from the interior of the aircraft, said pipe 10 being lead to a point of use of the heated medium.

The pipes used for holding the medium to be heated are usually of circular section. Consequently if this form of pipe is passed at right angles to the flow of gas in the conduits, a concentrated heating of the pipe takes place on the side of the pipe first contacted by the gases, and eddy currents which lessen the flow of the gases in the conduit, form on the lee side of the pipe. Thus, the localized heating of the pipe will cause failure thereof and allow noxious exhaust gases to enter into the pipe, while at the same time the efficiency of the recoil nozzles is lessened because of the reduced flow of the gas in the conduit. An arrangement of the pipe and the conduit that avoids these difficulties and disadvantages is produced by the instant invention.

A means of inserting a single pipe 10 through all the exhaust conduits is shown in Fig. 2. Each individual exhaust conduit has a tubular flange 14 secured to one side thereof, and a tubular flange 16 secured to the other side thereof. Flange 16 terminates in an enlarged flanged portion 18, and is provided with a projection 20 which bears against pipe 10. Flange 14, from one conduit 2, fits within flange 18 of an adjacent conduit, the joint therebetween being sealed by packing 22 which is held in place by ring 24 secured to flange 18 by bolts 26. Thus, two adjacent individual conduits are securely held together in a gas-tight manner, and a single pipe 10 can be inserted through the openings thus formed.

The construction of Fig. 2 has the advantage that the single pipe extending through all of the conduits 2 can be seamless, and thus the chance of leakage of exhaust gas into the pipe is greatly lessened. As a pipe of circular section creates an undesirable obstruction when the flow of gas is perpendicular to the pipe in the conduit 2, the pipe and conduit can be arranged so that the gases flow obliquely of the circular pipe to lessen the harmful effects of the obstruction, as shown in Fig. 3. Nozzle 2 is provided with an enlarged base portion 30 joined to the motor block 4, and is slightly enlarged at 32, Fig. 3a, to provide room for the passage of pipe 10 without diminishing the space required for the passage of the exhaust gases. By directing the end 8 of nozzle 2 rearwardly in the manner shown, the gases in the conduit 2 pass obliquely of pipe 10 and thus pass over an elliptical section of pipe 10, as clearly shown in Fig. 3a. Such elliptical section is in the nature of a streamlined form so that the passage of gases in conduit 2 is not materially impeded.

Figure 4:
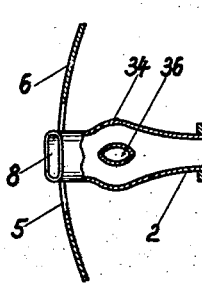

Other methods of combining the pipe and conduit are shown in Figs. 4 to 8, inclusive. In Fig. 4, the nozzle 2 is enlarged at 34, and a pipe 36 having an elliptical cross section is inserted through the conduit in the manner illustrated for the pipe 10 in Figs. 1 and 2. The elliptical section has its major axis parallel to the direction of flow of the exhaust gases in the conduit to produce a streamlined shape for the gases to flow over with undiminished velocity, while great heat exchange takes place between the gases and the air in pipe 36.

Figure 5:
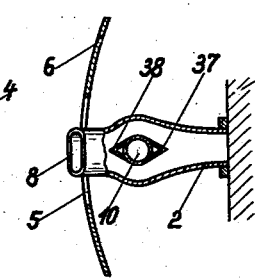
Figure 6:
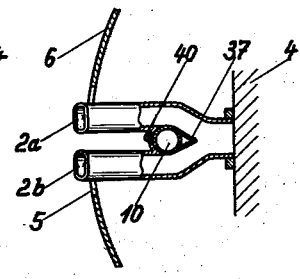

To use a single pipe 10 similar to that shown in Fig. 2, the construction of Fig. 5 is employed in which two V-shaped members 37 and 38 traverse the conduit on opposite sides of pipe 10. The ends of the legs of the V's lie tangent to the circular section of the pipe, and the three members together produce a lenticular or a substantially elliptical streamline section. Members 37 and 38 are either formed integral with the nozzle 2 through which the pipe 10 extends, or they can be secured to pipe 10. A variation of this form is shown in Fig. 6 wherein the nozzle 2 is bifurcated to form two nozzle members 2a and 2b, respectively. At the juncture of these two nozzles, 2a and 2b, is a connecting wall 40, beneath which the pipe 10 is passed. A V-shaped member 31, similar to member 37 in Fig. 5, creates a streamlined passage for the gases within the nozzle.

In Fig. 7, the same form of structure as shown in Fig. 5 is indicated, except that members 37 and 38 have been spaced to allow two pipes 10 to extend through conduit 2. Plates 43 tangent to pipes 10 form streamline walls for the uninterrupted flow of exhaust gases by the pipes.

A further form of the invention is illustrated in Fig. 8 wherein two separated pipes are inserted through the conduit. Each of these pipes is provided with members 37 and 38 as is the single pipe of Fig. 5.

It is thus apparent that the objects of the invention have been achieved, and that an intensive heat exchange between the medium and the gases in the conduit is obtained, while chance of leakage of exhaust gas into the medium is lessened, and the exhaust gases flow in the exhaust conduits so that the efficiency of the recoil nozzles is not diminished.

Having now described a means by which the objects of this invention may be obtained, what I claim as new and desire to secure by Letters Patent is:

1. In combination with a plurality of exhaust conduits, each of which has the form of a recoil producing nozzle, a seamless pipe successively extending through each conduit, and means for sealing the openings in the walls of said conduits through which said pipe passes against the leakage of exhaust gases from said conduits.

2. In the combination of claim 1, said means comprising means for coupling together adjacent conduits.

3. In the combination of claim 1, said means comprising tubular flanges projecting outwardly of the openings in the walls of said conduits, and means for coupling together the flanges of adjacent conduits.

4. In combination with a plurality of independent exhaust conduits, each of which is shaped to function as a reaction nozzle, attached to an aircraft engine, an air heating pipe extending successively through each of said conduits and being arranged to present a substantially streamlined surface in the path of the gases flowing through each conduit, and flanged tubular coupling concentric with said pipe joining adjacent conduits together.

ANSELM FRANZ.